April 2, 1963  G. B CARSON ET AL  3,083,580
DIGITAL CONTROLLED MACHINE
Filed March 7, 1957  11 Sheets-Sheet 8

INVENTORS.
Gordon B. Carson.
BY Walter L. Starkey.
Wood, Herron & Evans.
ATTORNEYS.

April 2, 1963  G. B. CARSON ET AL  3,083,580
DIGITAL CONTROLLED MACHINE
Filed March 7, 1957  11 Sheets-Sheet 9

INVENTORS.
Gordon B. Carson.
BY Walter L. Starkey.
Wood, Herron & Evans.
ATTORNEYS.

April 2, 1963   G. B. CARSON ET AL   3,083,580
DIGITAL CONTROLLED MACHINE
Filed March 7, 1957   11 Sheets-Sheet 11

INVENTORS.
Gordon B. Carson,
BY Walter L. Starkey.
Wood, Herron & Evans.
ATTORNEYS.

United States Patent Office 3,083,580
Patented Apr. 2, 1963

3,083,580
DIGITAL CONTROLLED MACHINE
Gordon B. Carson and Walter L. Starkey, Columbus, Ohio, assignors, by mesne assignments, to Selby International, Inc., Portsmouth, Ohio, a corporation of Delaware
Filed Mar. 7, 1957, Ser. No. 644,566
16 Claims. (Cl. 74—113)

This invention relates to apparatus by means of which a punched tape or other record is produced from a pattern; and is used to control a drive for effecting relative movement between a work carrying platen and a tool, so that the tool engages the work at predetermined intervals along the pattern.

The present invention is of particular utility when used in conjunction with apparatus for guiding movements of work in stitching machines, spot welding devices, heat and pressure machines for joining plastic materials, stapling machines, and the like. In these and other types of cyclically operable tools, it is frequently desirable not only to control the contour along which work is moved relative the tool, but also the amount the work is advanced between each successive actuation of the tool. In general, such devices are to be contrasted with various metal working machines such as, contour burning machines, and the like in which the only problem is to control the contour along which the work is moved relative to the tool, the rate of work advancement not being of critical importance.

In order to provide a fuller understanding of the present invention, it will be discussed in detail with reference to a stitching machine of the type used to fasten multi-thicknesses of material together, or to stitch a decorative pattern on a single thickness of material. It is to be understand that many of the problems inherent in the operation of such a device are also present in other types of equipment; and that some or all of the advantages provided by the present invention make it extremely useful for embodiment in other devices.

Stitching machines are used in large numbers in many industries, such as the shoe industry. At the present time, it is conventional in such commercial stitching operations to rely upon skilled operators who manually guide the articles to be stitched beneath the sewing machine head. Two problems result from this type of operation. In the first place, hand stitching, especially of complex decorative patterns of the type frequently used in women's shoes, introduces an excessively high labor cost. Furthermore, even skilled operators do not accurately reproduce the desired pattern with a uniform stitch length, so that the appearance of the finished article is not as attractive as the original design.

It is the principal object of the present invention to provide means for automatically guiding work relative to a tool, such as a stitching machine head so that the original pattern is accurately reproduced and a uniform stitch spacing is obtained. In accordance with the present invention, a record, such as a punched or magnetic tape is prepared from the original stitching pattern. This tape is then employed to control one or more automatic stitching machines so that the worktable, or platen, is automatically moved in accordance with the information stored on the tape to reproduce accurately the original pattern. Moreover, as explained below, the platen is shifted a substantially equal distance along the pattern between each successive needle penetration, so that not only does the stitching follow the desired pattern, but the stitches are of substantially the same length, thereby greatly enhancing the attractiveness of the stitched article.

In a plant utilizing the present apparatus, the operator merely loads and unloads material on the worktable, the work being automatically guided through the machine. Thus, a single, relatively unskilled operator can supervise the operation of several machines, thereby replacing the skilled operators previously required. Furthermore, the stitch pattern conforms much more closely to the desired pattern than when the work is shifted manually by an operator; and a much higher degree of uniformity is obtained in the finished goods.

In general, a stitching machine constructed in accordance with the present invention includes a stationary head supporting a conventional reciprocating needle. A worktable is mounted for universal movement beneath the needle. Two component drive mechanisms are provided, each drive being effective to control movement of the worktable along one of two perpendicular axes. By combining movements along the two axes, the worktable can be shifted in any desired direction to bring any point on the table into registry with the needle. Movement along each axis is effected in multiples of a small unit increment such as, for example, .005″. Since the two corresponding axes of movement are at right angles to one another, the net, or resultant, movement of the worktable is the vector sum of the two component movements and its length is equal to the hypotenuse of the right triangle formed by the two component movements.

It is the concept of the present invention to shift the worktable along the pattern in a succession of movements; each movement taking place while the needle is out of engagement with the work and being constituted by component movements along each of the two axes. Each set of component movements has substantially the same vector sum or hypotenuse length. For example, if the desired stitch length (or hypotenuse length) is equal to 13 increments of movement, the platen is always shifted by means of one of the following pairs of component movements; it being understood that the increments of movement can take place along either axis: 0 and 13, 1 and 13, 2 and 13, 3 and 12, 4 and 12, 5 and 12, 6 and 11, 7 and 11, 8 and 10, or 9 and 9. The variation in stitch length due to the small differences in hypotenuse length resulting from these combinations is imperceptible. However, if for some particular application, still greater accuracy is desired, it can readily be obtained by increasing the number of increments of hypotenuse length and making each individual increment smaller.

One preferred from of apparatus constructed in accordance with the present invention for producing a record to control platen movement includes a curve follower which is adapted to trace a stitching pattern plotted to scale and oriented relative to two perpendicular axes corresponding to the axes of worktable movement. Starting from a predetermined point on the pattern, the tracing head moves along the pattern and actuates two coordinate signal generators which produce an electrical signal for each increment of movement along the axes. These signals are applied to binary counters which count and store and number of signals. As explained below, each of the signal generators is effective to indicate the direction along the axis in which the follower moves between signal pulses. The output signals from the binary counters are employed to condition tape punches for actuation. Additional signals from the binary adders are also applied to a stitch spacing control circuit which is effective to cause actuation of the conditioned punches to form one set of instructions on the tape whenever the two component movements corresponds to one of the selected pairs, such as one of those listed above. As soon as the instructions are punched in the tape, the binary counters are automatically reset to 0 to prepare them for further counting as the tracing head moves over the pattern.

When the tape or other record has been prepared indicating each of the successive movements required to completely traverse the pattern, the tape is inserted in a suitable reader adapted to produce electrical signals corresponding to the binary coded information stored in the tape. These electrical signals are decoded either electrically or mechanically and are used to actuate solenoids which control gears in the component drive units. These gears have different pitches so that depending upon which gear is engaged, the platen is driven from 0 to the maximum number of increments desired (13 in the embodiment discussed above).

One of the principal advantages of an installation of this type is that the tapes are simple to produce, are readily stored and easily inserted in the reading device. Thus, in a factory, such as a shoe factory, where a relatively small number of articles is made in accordance with each particular design, the use of automatic equipment is greatly facilitated, since no expensive and cumbersome cams or templates are required. Furthermore, one tape and reader provide electrical signals which can be used to control any number of machines. Moreover, the present apparatus is highly advantageous because of its adaptability to the production of products which vary is sizes and widths, such as shoes.

Another advantage of the present apparatus is that it provides positive displacement of the work platen so that no errors are introduced in work position due to inertia of the worktable and other moving parts. It is one of the important concepts of the present invention to substitute the readily controlled minor deviations in stitch length caused by variation in lengths of the hypotenuse for the substantial errors introduced in a servo-mechanism type device by the inertia of the worktable.

Moreover, the present apparatus is completely self-compensating so that minor errors introduced by variations in hypotenuse length, or by the fact that the curve follower has traversed a fractional increment when the tape is punched are automatically compensated for. Thus, not only is the placement error for each stitch limited to a predetermined maximum amount, but the total cumulative error after any number of stitches is also limited to this same small maximum.

A still further advantage of the present invention is that it provides means for stitching any pattern no matter how large or complex the pattern may be.

A still further advantage of the present invention is that the gear units for driving the platen provide an extremely large force for shifting the platen and are effective to displace the platen a positive distance each time the gear unit is actuated so that no error in position is introduced by the platen's inertia or friction.

The modified form of gear unit is particularly advantageous because it also provides means for mechanically decoding the binary input signals to a digital output signal, thereby eliminating the need for an electrical decoder.

These and other objects and advantages of the present invention will be more readily apparent from a consideration of the following detailed description of the drawings illustrating a preferred embodiment of the invention.

GENERAL DESCRIPTION

Figure 1:
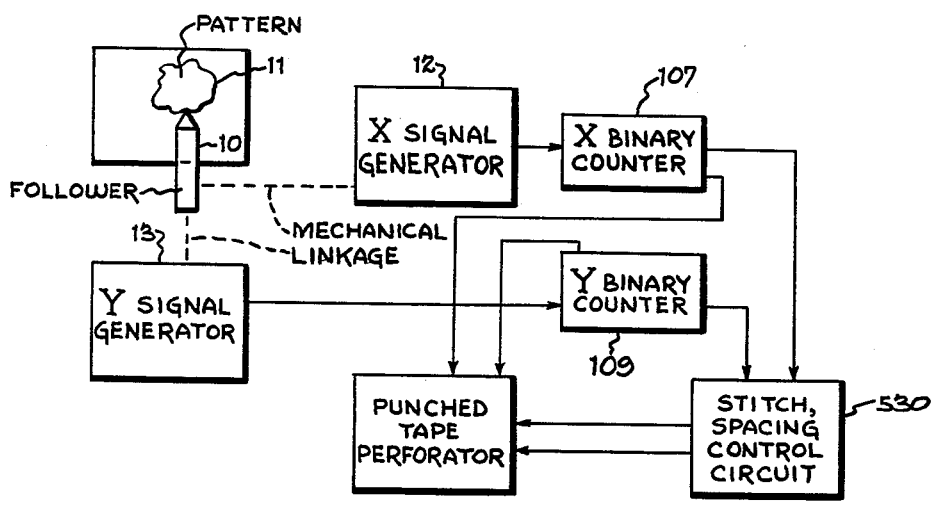
FIGURE 1 is a schematic block diagram of the mechanism and circuits for punching a control tape.

One preferred embodiment of the invention, as shown in the drawings and described in detail below, is an automatic stitching machine in which material is moved past a reciprocating needle in such a manner that irrespective of the contour being stitched, the stitches will be substantially uniformly spaced. From the foregoing discussion of the general principles of the invention and the following detailed description of this particular embodiment; those skilled in the art will readily comprehend the various modifications to which the invention is susceptible. For example, the control circuits and platen shifting mechanism described herein can readily be employed to shift work relative to any type of tool in which it is desirable to control the rate of work movement past the tool as well as the path along which the work is advanced. One such device is a seam welder; another is a heat sealing device for joining plastic material. An additional application of the circuits and mechanism of the present invention is to machines in which it is desirable to present a work piece to a tool so that a plurality of operations are performed at equispaced points along a predetermined pattern. For example, in spot welding it is frequently desirable to present work to welding electrodes so that equispaced welds are made along a particular pattern.

In general, an automatic stitching machine comprises a follower for tracking along a pattern and means for producing a record of the follower movements. This record is subsequently utilized to control apparatus for shifting a work holding platen beneath a reciprocating needle; the record being effective to cause the platen to reproduce the movements originally made by the follower in tracing the pattern.

FIGURE 1 discloses the general circuit arrangement for producing a record on an intelligence medium which can later be used to control movements of a worktable so that a workpiece will be moved beneath the tool in accordance with the desired pattern. As shown in FIGURE 1, a follower 10 is moved along the pattern 11 to be reproduced. The follower is mounted for universal movement along the plane of the pattern 11 and is connected by suitable linkages to two coordinate signal generators 12 and 13. Each coordinate signal generator is responsive to the component movements of the follower along one of the two axes angulated with respect to one another. These axes are preferably disposed at right angles to one another, although a workable device could be constructed using two coordinate axes disposed at some other angle.

In the embodiment shown, follower movements and subsequent corresponding movements of a work holding platen, are accomplished by combined movements along a first axis (horizontal in the drawings) referred to as an "X axis" and a second axis (vertical in the drawings) referred to as a "Y axis." Movements of the follower along each axis are divided into increments of a predetermined length; for example, .005 inch. Two signal generators are connected to the follower. Each signal generator is effective to generate a pulse for each increment of travel of the follower along the axis with which the signal generator is associated. Each coordinate signal generator is also effective, as explained in greater detail below, to indicate by the sequence in which pulses are produced the direction along the axis in which the follower is being shifted.

The output from each signal generator is applied to a binary counter. As explained in greater detail below, a binary counter is effective to count and store the number of pulses generated by each coordinate signal generator. A signal corresponding to this number is produced by the binary counter and is applied to a record forming device, in this embodiment, a tape perforator. In the perforator this signal is effective to condition a plurality of punches for actuation so that a tape will be punched in conformity with the number of pulses received by the counters.

The output of each of the counters is also applied to a stitch spacing control circuit, which functions to control the length of pattern along which the work is advanced between successive needle penetrations. That is, between successive needle penetrations the work carrying platen is shifted along each coordinate axis. The function of the stitch spacing control circuit is to regulate the length of the coordinate movements so that each set of corresponding "X" and "Y" movements causes the same length of pattern to pass beneath the needle. Specifically, the stitch spacing control circuit actuates the perforator punches whenever the combination of "X" increments and "Y" increments is equivalent to a movement along a predetermined length of pattern. In addition, the stitch spacing control circuit functions to reset the counters to prepare them for counting the signals caused by the next movement of the follower.

Figure 3:
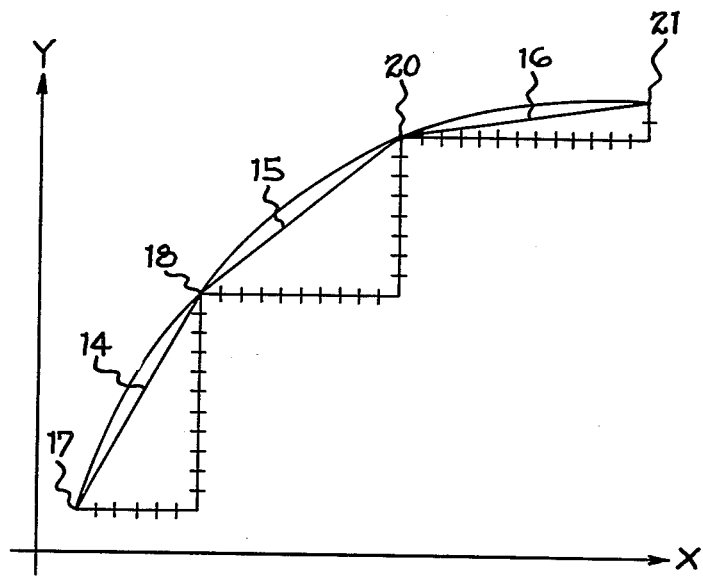
FIGURE 3 is a greatly enlarged segment of a pattern illustrating the way in which the pattern is broken up into increments of component movements.

It is felt that at this point, a brief reference to FIGURE 3 will help to clarify the function of coordinate signal generators 12 and 13, the binary counters and the stitch spacing control circuit. FIGURE 3 represents a greatly enlarged segment of a pattern 11 to be reproduced. If the stitch spacing or distance between successive stitch positions, or points where the needle penetrates the material, is held constant, the chordal distances 14, 15, and 16 must be equal. Each chordal distance forms the hypotenuse of a right triangle having sides parallel to the two coordinate axes. If each coordinate axis is considered as being divided into a large number of equal increments, there are many combinations of increments along the two axes which will yield substantially equal hypotenuses.

For example, assume that each increment of movement along the "X" and "Y" axis is equal to .005 inch and it is desired to stitch the pattern at sixteen stitches per inch; then between each successive stitch, or needle penetration, the work holding platen must be moved beneath the needle a distance such that .0625 inch of pattern length passes beneath the needle. The movement along each component axis can comprise from zero to thirteen increments of movement. When the vector sum (hypotenuse length) of these increments is equal to .0625 inch, the tape should be punched with instructions for effecting one set of movements of the worktable. That is, the tape should be punched so that the table will be caused to move along each of the axes a distance such that .0625" of pattern passes beneath the needle.

As shown in FIGURE 3, between stitch positions 17 and 18, the tape should be punched so that the worktable will be shifted six increments in the "X" direction and eleven increments in the "Y" direction. Similarly, the tape should be punched to indicate ten increments of movement along the "X" axis and eight increments of movement along the "Y" axis between stitch positions 18 and 20. In a like manner, the tape should be punched to indicate thirteen increments of movement along the "X" axis and two increments of movement along the "Y" axis between switch positions 20 and 21. A table is produced below showing the different combinations of "X" and "Y" incremental movements which provide for substantially uniform spacing between successive stitch positions.

*Table 1*

| X Increments | Y Increments | Total Movement |
|---|---|---|
| 0 | 13 | .065 |
| 1 | 13 | .065 |
| 2 | 13 | .066 |
| 3 | 12 | .062 |
| 4 | 12 | .063 |
| 5 | 12 | .065 |
| 6 | 11 | .063 |
| 7 | 11 | .065 |
| 8 | 10 | .064 |
| 9 | 9 | .064 |
| 10 | 8 | .064 |
| 11 | 6 (or 7) | .063 |
| 12 | 3 (or 4 or 5) | .062 |
| 13 | 0 (or 1 or 2) | .065 |

It can be seen from the above table if no movement in the "X" direction is combined with thirteen increments in the "Y" direction, the pattern is moved a total of .065 inch; while if six increments of movement in the "X" direction are combined with eleven increments in the "Y" direction, the pattern is shifted .063 inch. Using the various combinations of increments in the table, the total variation in stitch length never exceeds .005 inch, which is an imperceptible deviation.

Of course, if for a particular application a greater uniformity is required, the pattern can be broken up into smalled increments as explained below. At any rate, in the embodiment shown, one function of the coordinate signal generators is to provide a pulse for every .005 inch of tracer movement along the coordinate axis with which the particular generator is associated. In addition, as explained below, the coordinate signal generators also provide information concerning the direction of movement along the axis.

Figure 2:
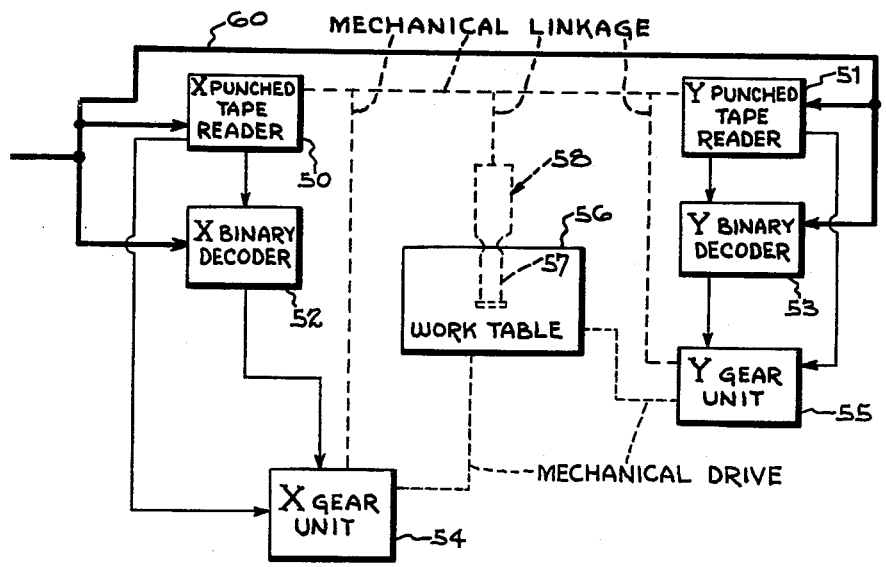
FIGURE 2 is a schematic block diagram of the mechanism and circuits for transforming the information stored on a punched tape to movements of a worktable.

After a punched tape has been perforated to indicate various sets of coordinate movements made by the follower in tracking over a pattern, it is used in conjunction with the apparatus shown in FIGURE 2 for automatically shifting a worktable beneath the head of a stitching machine to reproduce the movements previously made by the tracing head. The worktable, or platen, is shifted so that it makes one set of coordinate movements between each pair of successive needle penetrations.

As shown diagrammatically in FIGURE 2, when used to control platen movement the punched tape is inserted in an "X" tape reader 50 and a "Y" tape reader 51. In practice, these readers can be part of a single reading device. The readers function to produce electrical signals corresponding to information stored on the punched tape. In one embodiment these signals are fed to an "X" binary decoder 52 and a "Y" binary decoder 53 which transforms the coded signals obtained from the tape readers into signals for operating solenoids within the "X" and "Y" gear units 54 and 55 of the two components platen drive assemblies. As explained in detail below in a second embodiment the reader output signals are employed to energize solenoids in a gear unit which incorporates mechanical means for decoding the signals. In either case, the "X" component drive assembly is effective to shift platen 56 in one direction (horizontal in the drawing) while the "Y" component drive is effective to shift the paten in a perpendicular direction (vertical in the drawing). By combining movements in each of these directions any point on the worktable can be brought into registry with head 57 of stitching machine 58.

Heavy line 60 indicates the power supply line for the tape readers and binary decoders; while the light solid lines indicate the path of signals from the readers to the decoders and ultimately to the gear units. As described below and indicated by dotted lines, the reader and gear units are synchronized through suitable mechanical linkages with the stitching machine, so that the worktable is shifted only while the needle is out of engagement with the work.

One preferred form of component drive for shifting a worktable the required number of increments along an axis to position the table for successive needle penetrations is shown in FIGURES 6 through 9. For the present purposes, however, it will suffice to say that each component drive assembly includes an input shaft turned in synchronism with the sewing machine spindle. A suitable device, such as a Geneva drive, transforms this motion into intermittent motion of a main drive worm which turns a predetermined portion of a revolution between each successive pair of needle penetrations. A gear drive interconnects the main drive worm and a power screw which actually shifts the worktable. The gear unit includes a plurality of solenoid controlled spindle worm gears which are driven by the main power worm and are selectively engageable with an output worm shaft which is connected to the power screw through a reversing mechanism, the function and operation of which is explained below.

The lead of each spindle worm varies; the spindle worm having the smallest lead is effective to cause the platen to be shifted one increment of movement in response to the rotation of the driving worm between successive needle penetrations. The next spindle worm has a lead twice as great, so that the platen is advanced two increments of movement; while the remaining worms are respectively effective to cause the platen to be shifted by three increments, four increments and so on. The solenoids which shift the spindle worms into operative engagement with the output worm shaft are energized by output signals from the "X" and "Y" binary decoders. Obviously only one solenoid is energized and one spindle worm is positioned for engagement with the output worm at any time.

Thus, when the table is to be shifted between stitch positions 17 and 18 of the pattern of FIGURE 3, the punched tape causes the "X" binary decoder to produce a signal for energizing the six increment spindle worm in the "X" gear unit and causes the "Y" binary decoder to energize the eleven increment spindle worm in the "Y" gear unit. Consequently, between the time that the stitching needle is withdrawn from the work at position 17 and the time that it again penetrates the work, the work holding platen is shifted six increments in the "X" direction and eleven increments in the "Y" direction so that point 18 of the work is located beneath the needle.

The various components of the record producing apparatus and the record controlled stitching apparatus will now be described in detail.

ELECTRICAL DECODING UNIT

Figure 4:
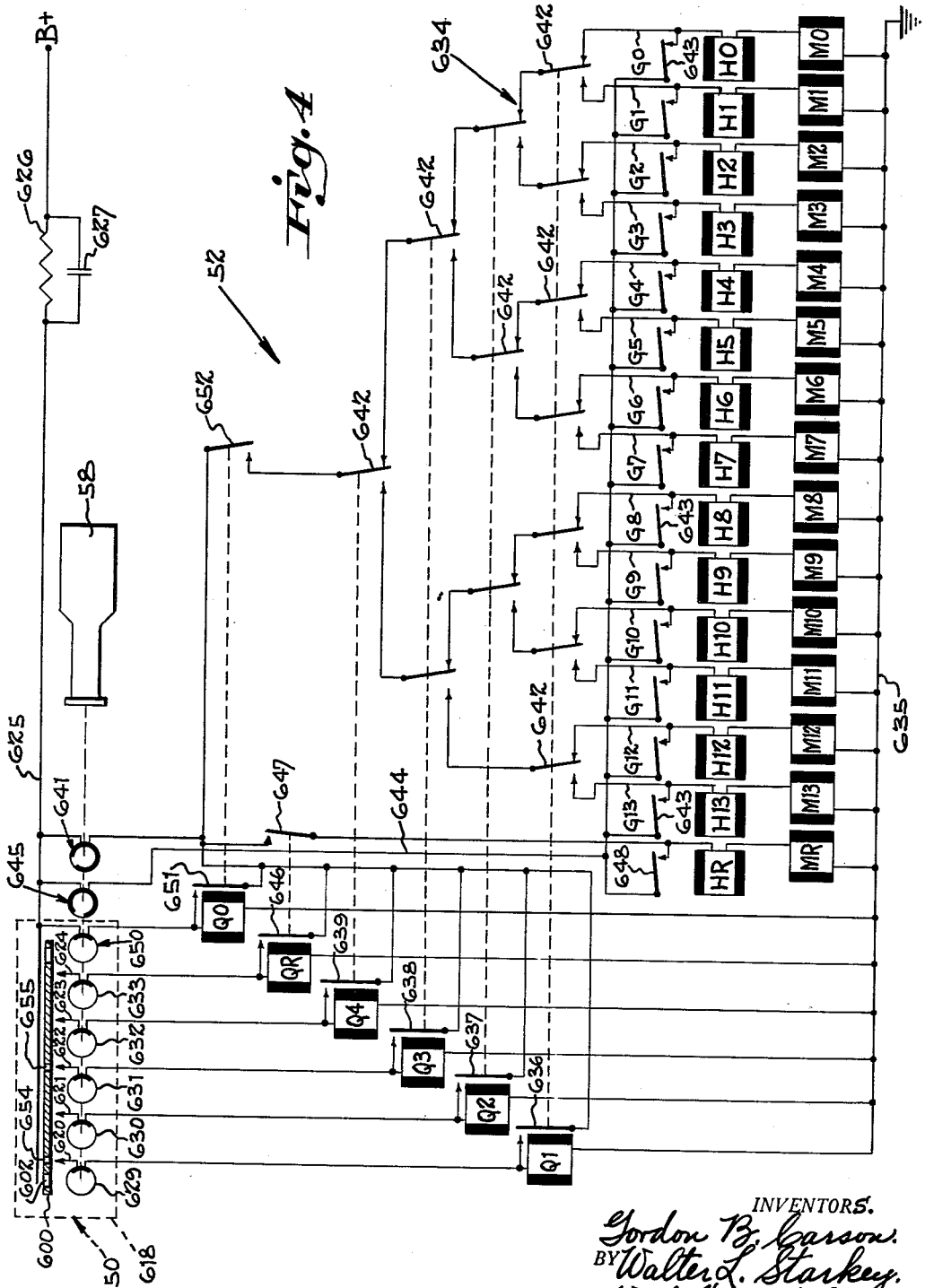
FIGURE 4 is a schematic circuit diagram of the tape reader, decoding circuit, and the solenoid energizing circuit of the platen driving mechanism.
Figure 5:
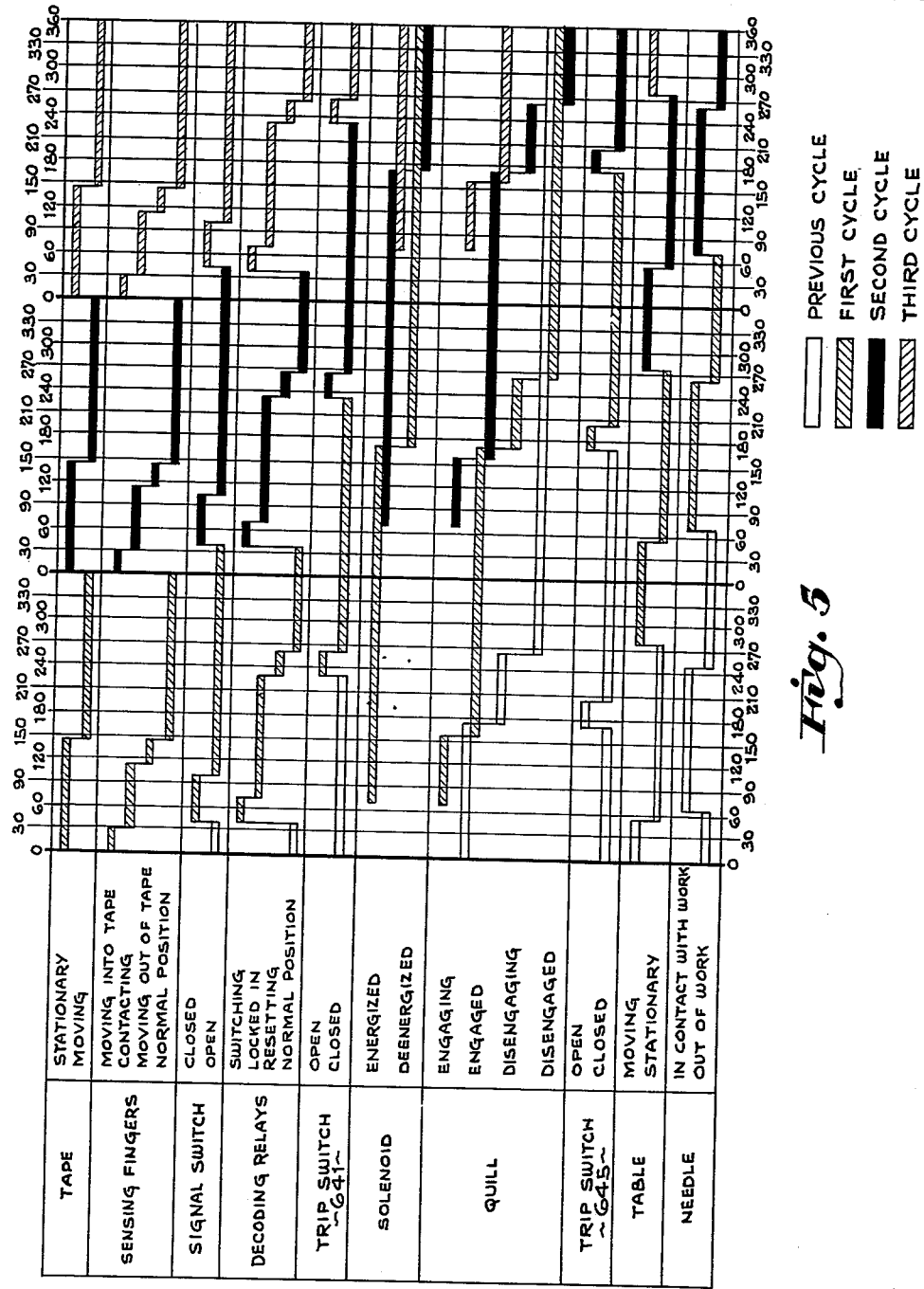
FIGURE 5 is a chart illustrating the sequence of operation of a stitching machine, tape reading device and driving solenoids.

The function and manner of operation of the electrical decoding unit 52 can best be understood by reference to FIGURES 4 and 5. As shown in FIGURE 4, decoding unit 52 is operated in timed synchronism with stitching machine 58 and functions to transform the information stored on punched tape 600 to electrical signals for operating quill actuating solenoids M0–M13 and MR in "X" and "Y" gear units 54 and 55 of the "X" and "Y" component drive assemblies.

Since the decoder units for controlling the "X" and "Y" drives are identical, only the "X" decoding unit 52 will be described. Specifically, the "X" decoding unit 52 includes a tape reader 50 indicated by dotted lines 618. This tape reader can be of any suitable type for sensing perforations in punched tape; for example, one suitable form of reader is manufactured by Commercial Controls Corporation in accordance with the disclosure of Blodgett Patent No. 2,700,446, noted above. While the precise details of this reader constitute no part of the present invention, its general construction will be briefly described. As indicated in FIGURE 4, the tape reader includes five sensing fingers 620, 621, 622, 623, and 624 spaced transversely of tape 600 which is fed through the reader by a suitable tape advancing mechanism. Each of the fingers is disposed for engagement with one column of apertures punched in the tape; and is adapted when in registry with an aperture to make contact with conductor 625 which is connected to a source of B+ voltage through a resistor 626 and capacitor 627.

A plurality of signal switches 629, 630, 631, 632, and 633 are connected in series with fingers 620–624. These switches are preferably rotary or cam operated switches, and as explained below, are actuated so that the signal switches are closed after the sensing fingers have been brought into engagement with the tape. Similarly, these switches are opened before the sensing fingers move away from the tape so that any arcing occuring in the tape reader occurs in the signal switches rather than at the tape sensing fingers.

Output signals from the five signal switches 629–633 are respectively applied to decoding relays Q1, Q2, Q3, Q4, and QR of binary decoding circuit 634 which is generally similar to the "X" decoding unit 557 in the stitch spacing control circuit. More particularly, the binary decoding circuit includes four relays Q1–Q4; each relay coil having one terminal connected to its associated signal switch and the other terminal connected to ground line 635. Each relay has associated therewith one contact 636, 637, 638, and 639 which functions as a hold-in contact to maintain the relay coil in an energized state after the relay circuit is broken at the signal switch, until the opening of a tripping switch 641 which is operated in timed relationship with the sewing machine and includes contacts placed in series with B+ line 625 and hold-in contacts 636–639.

Each of the relays Q1–Q4 also actuates one or more of a plurality of contacts 642 arranged in a conventional pyramid or cascade fashion. These latter contacts control the energization of solenoids M0–M13 and hold-in relays H0–H13 which are connected in series with the solenoids and with output lines G0–G13 of the decoder network. Each of the hold-in relays includes a set of contacts 643 which are closed when the relay is energized. These contacts are effective to complete a circuit from the relays and their associated solenoids by-passing the decoding network 634, to B+ line 625 through a conductor 644 and tripping switch 645.

In addition to these components, decoding unit 52 includes a reverse relay QR which is placed in series with sensing finger 633 and ground line 635 and is effective when energized to close hold-in contacts 646 and reversing contact 647. This latter contact is effective to complete a circuit from B+ line 625 and switch 641 to hold-in relay HR and reversing solenoid MR. Hold-in relay HR is provided with a contact 648 connected in the same manner as the hold-in contacts of relays H0–H13. The decoding unit also includes a signal switch 650 placed in series connection with a solenoid Q0 having a hold-in contact 651 and a primary contact 652 placed in series with the pyramided contacts of decoding network 634.

FIGURE 5 is a chart showing in detail the timed sequence of operation of the decoder unit. The times indicated on the graph are in terms of angular displacement of input shaft 653 of the "X" gear unit 54. In one embodiment, an angular displacement of 7.2° corresponds to one millisecond. At the beginning of the operating cycle, the punched tape is stationary for approximately 145°.

As soon as the tape is brought to a stop, sensing fingers 620–624 are shifted toward the tape by means of a suitable cam mechanism. Whenever the tape contains an aperture, such as apertures 654 and 655 in registry with a finger, the finger passes through the aperture and engages conductor 625. This contact is made within approximately 30° of shaft revolution, or .004 second.

Approximately 10° after the fingers have made contact with the tape and/or conductor 625, signal switches 629–633 close to complete circuits to those relays associated with the fingers in registry with apertures in the tape. For example, with tape 600 punched as shown in FIGURE 4, relays Q1 and Q3 are closed. These relay contacts close in approximately 30°. As soon as the relays close, they are locked in by a circuit completed through their associated hold-in contacts and tripping switch 641. 35° after the decoding relays Q1–Q4 are locked in, the signal switches are opened. This is followed by movement of the sensing fingers away from the tape. As soon as the fingers are shifted free of the tape, the tape advancing mechanism is actuated to move the tape to bring the next row of apertures into registry with the sensing fingers.

As soon as one or more of the decoding relays Q1–Q4 are energized, contacts 642 associated with the energized relays are closed to complete a circuit to one of the lines G0–G13 (G0 being energized if none of the decoding relays is energized). When a circuit is completed to one of these lines, the hold-in relay H0–H13 and the quill solenoid M0–M13 connected to the line are energized. As explained below, when a quill solenoid is energized, the quill connected to this solenoid is shifted so that the worm of the quill meshes with a worm on the output shaft to drive the platen. The time, in terms of angular motion, required to shift a quill so that its worm is in driving engagement with the output shaft worm, depends upon the force available from the quill solenoid M0–M13. For one suitable solenoid, this time is approximately 90°.

Ten degrees after full engagement of the worms, tripping switch 645 is opened to deenergize the quill solenoid and its associated hold-in relay which were locked in from the previous cycle, thereby disengaging the previously engaged quill. Since at this point in the cycle, the signal from the tap is still retained in the locked-in decoding relays Q1–Q4, the newly selected solenoid is not tripped along from the one from the previous cycle. That is, at this point in the cycle, the decoding relays originally energized through the sensing fingers, remain energized through hold-in contacts 636–639. Thus, those contacts in network 634 actuated by the energized decoding relays remain closed, completing a circuit to one quill solenoid M0–M13 and its associated hold-in relay H0–H13, despite the opening of the hold-in relay bypass circuit at tripping switch 645.

As explained below, this overlapping of quill worm engagement is necessary to prevent any unwanted shifting of the worktable. After the previously energized solenoid is deenergized tripping switch 645 again closes; after which tripping switch 641 is opened to deenergize those decoding relays locked in by their hold-in contacts. The platen or worktable begins to move approximately 15° after the previously engaged quill is completely disengaged. As explained below, the distance the table is shifted depends upon the gear ratio of the quill which has been actuated. This motion of the worktable takes place over approximately 135°. Thus, out of each operating cycle, the workpiece is stationery for 225°, corresponding to the time needed for altering the quill engagement. The sewing machine needle is free to contact the work during this portion of each cycle.

The operation of the decoding circuit is substantially speeded-up by the incorporation of resistor 626 and capacitor 627 in B+ line 625. These impedances facilitate the use of a B+ voltage source greater than the rated relay voltage. Series resistor 626 limits the steady state operating current to the rated value of the decoding and tripping relays. However, the current build-up in the relays, during the transient period immediately following the completion of a circuit to the relay coils, is reduced to the order of forty percent of the time required when no external resistance and a voltage source of the rated value are provided. Capacitor 627 shunted across resistor 626 and preferably of a size equal to 500/the resistor value microfarads further decreases the response time.

GEAR UNITS

"X" gear unit 54 and "Y" gear unit 55 function to transform the electrical signals produced by their respective binary decoders 52 and 53 into movements of the worktable. Since these units are identical, only "X" gear unit 54 will be described in detail. As described above, "X" gear unit 54 includes an input shaft 653 which is driven in timed synchronism with the spindle of the sewing machine. This unit also includes a plurality of solenoids M0–M13 and MR for selectively engaging gears to provide a connection between input shaft 653 and an output shaft 690 which, as explained above, is in driving connection with the work table.

"X" gear unit 54 comprises three subunits, namely, an intermittent drive mechanism 711, a worm-gear unit 712, and a reversing unit 713. More particularly, as shown in FIGURES 6–9, "X" gear unit 54 comprises a housing 714 formed of metal plates welded, or otherwise secured, together as at 715. One end wall 716 of the housing carries a bushing 717 for journaling input shaft 653. This shaft carries the driving member 718 of a Geneva-type drive. Driving member 718 is keyed, or otherwise joined, to shaft 653 for rotation herewith and includes a radially extending arm 720. The outer end of arm 720 rotatably supports a driving roller 721. This roller is adapted to engage each of a plurality of radial slots 722 formed in Geneva-follower member 723.

In the embodiment shown, Geneva-follower member 723 is mounted on a shaft 724 journalled in anti-friction bearings mounted in end wall 716 and transverse wall 725. This follower member 723 is provided with eight radially extending arms 726, each arm having a radial slot 722 formed therein. It can be seen that as shaft 653 rotates follower 718 through a complete revolution, the follower enters one slot 722 and forces the Geneva-follower to rotate ⅛ of a revolution, or 45°, before the drive becomes disengaged from the follower. A main driving gear 728 is mounted upon shaft 724 and is joined in any suitable manner to follower member 723 for rotation therewith.

This gear 728 engages pinions 730 and 731 carried by secondary shafts 732 and 733. Shafts 732 and 733 are journaled in suitable bearing members carried by end wall 716 and transverse wall 725. These shafts 732 and 733 carry fourteeen quill assemblies 734. Seven quill assemblies are mounted on each shaft, the quills on each shaft being aligned with the respective quills on the opposite shaft.

Figure 6:
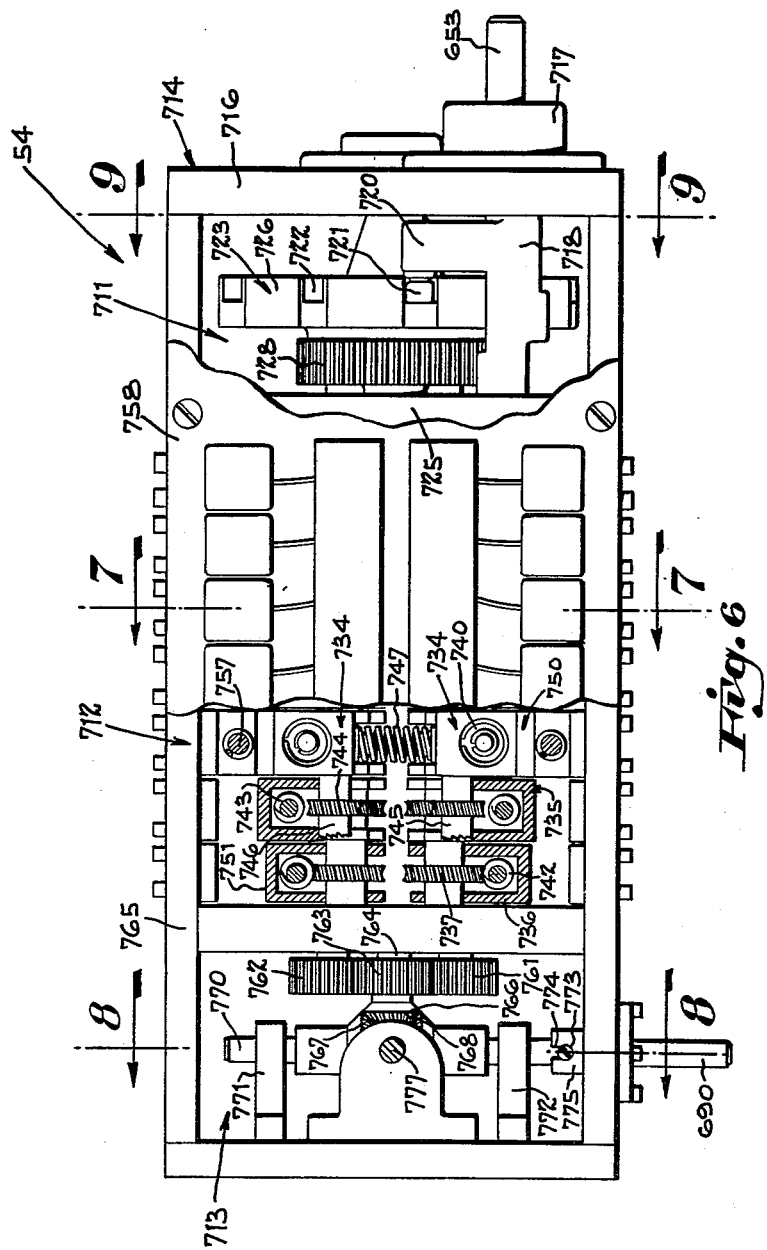
FIGURE 6 is a top view partially broken away of a component drive unit for a work holding platen.
Figure 7:
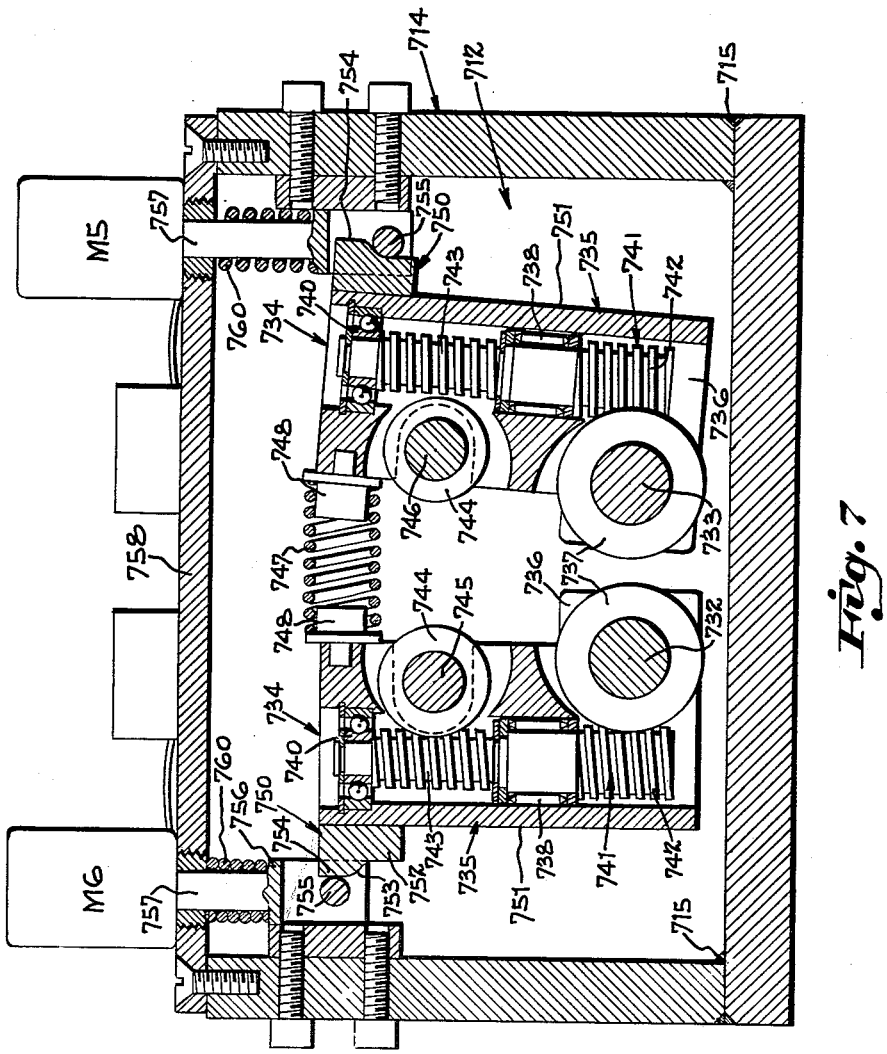
FIGURE 7 is a cross-sectional view taken along line 7—7 of FIGURE 6.
Figure 8:
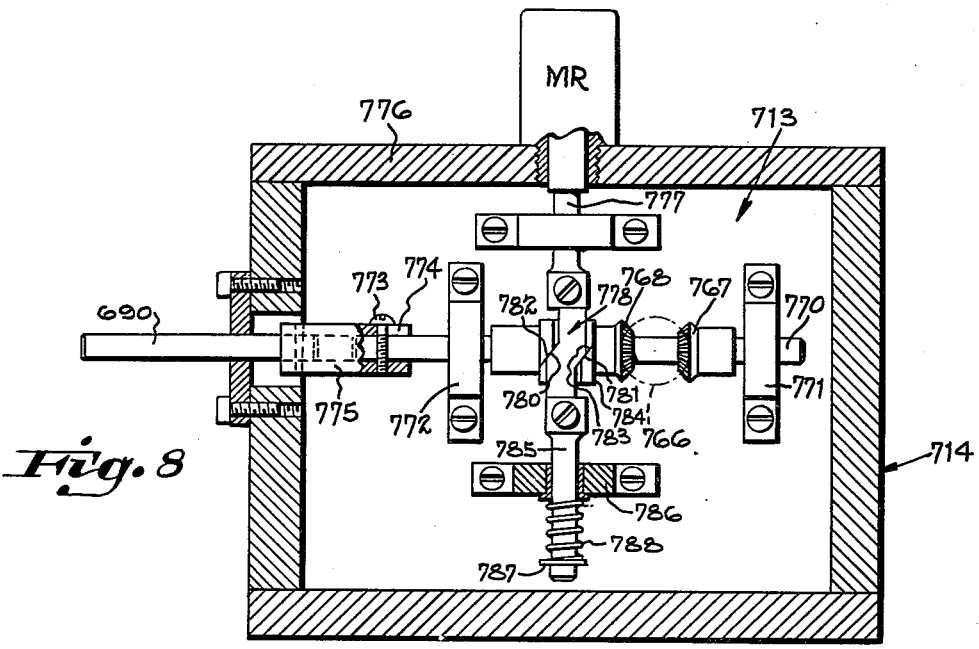
FIGURE 8 is a cross-sectional view taken along line 8—8 of FIGURE 6.
Figure 9:
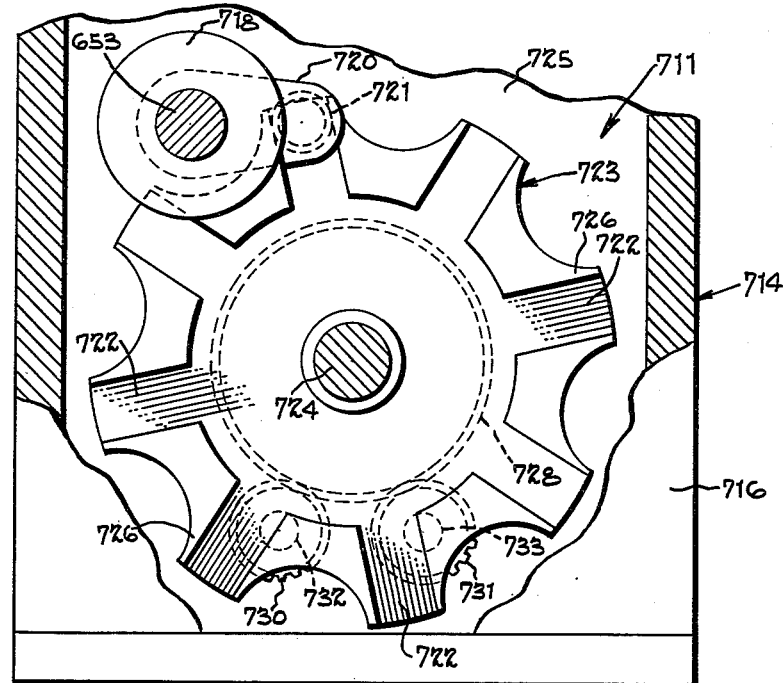
FIGURE 9 is a cross-sectional view taken along line 9—9 of FIGURE 6.

Each of the quill assemblies comprises a quill casing 735 having two-spaced arms 736 rotatably mounted by means of any suitable anti-bearings (not shown) on secondary shaft 732 or secondary shaft 733. As best shown in FIGURE 6, the spaced arms 736 of each quill assembly embrace a bevelled gear 737 keyed, or otherwise mounted, for rotation with the secondary shaft. Quill housing 735 supports a needle bearing 738 and a roller bearing 740 which rotatably journal a worm 741. This worm has a first threaded portion 742 in engagement with bevel gear 737 and a second threaded portion 743 adapted for engagement with a bevel gear 744 mounted upon a longitudinal shaft 745 or 746.

Each of the quill housings is normally urged by means of a compression spring 747 to a position in which worm section 743 is spaced from the adjacent bevel gear 744. This spring is compressed between two cylindrical mounting members 748 secured to the upper, or free end, of each of the quill assemblies. Since, as explained above, the quill housings mounted on shaft 732 are disposed in transverse alignment with the housings mounted on shaft 733, each spring 747 is effective to position two quill assemblies.

The upper end of each of the quill housings 735 also carries a cam or wedge member 750 mounted upon the outer wall 751 of the housing remote from gear 744. This cam includes a thin lower section 752 joined by an arcuate portion 753 to a thickened upper portion 754. Each of the cams 750 is adapted for engagement with a pin 755 mounted upon a bracket 756, in turn, secured to armature 757 of a quill actuating solenoids M0–M13. These solenoids are bolted or otherwise secured to cover 758 of the gear unit housing directly over their associated quill assemblies. The armatures of these solenoids are normally extended to the position shown by the right-hand armature associated with solenoid M5 in FIGURE 18. When the armature is thus positioned, pin 755 engages the lower portion of cam 750 permitting the quill assembly to be forced away from gear 744 by the compressive force of spring 747. However, when the solenoid coil is energized, armature 757 is retracted against the force of spring 760. This causes pin 755 to engage arcuate section 753 and finally thickened portion 754 of cam 750 forcing the quill inwardly and locking it in a position in which worm-section 743 is in driving engagement with bevel gear 744.

It is to be understood that the gear and worm sets of the quill assemblies associated with each of the solenoids M1–M13 are of a different pitch so that for a given rotation of secondary shafts 732 and 733 longitudinal shafts 745 and 746 and hence output shaft 337 are rotated different amounts. The worm and gear assembly 712 associated with quill solenoid M1 is effective to rotate output shaft 690 a sufficient amount so that the platen is shifted one unit of length (.005" in the present embodiment) along the "X" axis. The worm and gear associated with solenoid M2 cause the output shaft to be rotated twice as far, so that the platen is driven two units or (.01"). Similarly, the worm and gear associated with solenoid M3 cause the output shaft to be driven three times as far; and so forth. The worm forming part of the quill assembly actuated by solenoid M0 is locked against rotation. Consequently, when this worm engages a gear on secondary shaft 732 or 733, it effectively locks the output shaft to prevent the platen from being inadvertently shifted when 0 increments of movement are signalled by the tape.

Each of the longitudinal shafts 745 and 746 carries a pinion 761, 762 in driving engagement with a gear 763 mounted upon shaft 764 in reversing unit 713. Shaft 764 is journaled in a suitable anti-friction bearing mounted in transverse wall 765 and carries on one end a bevel gear 766.

This bevel gear is adapted to be selectively engaged by either bevel gear 767 or bevel gear 768 mounted on reversing shaft 770. This shaft is rotatably and slidably journaled in bearing blocks 771 and 772. One end of shaft 770 carries a pin 773 received within a longitudinal slot 774 in collar 775 mounted on output shaft 690. Slot 774 extends longitudinally of collar 775 a sufficient distance to accommodate the movement of reversing shaft 770 required to bring gears 767 and 768 into engagement with bevel gear 766. When reversing shaft 770 is positioned with gear 768 in engagement with gear 766, output shaft 690 is driven in a direction to shift the platen in the positive "X" direction. However, when reversing shaft 770 is shifted to the left to bring gear 767 in engagement with gear 766, output shaft is driven in the reverse direction so that the platen is shifted in the negative direction.

The position of shaft 770 is controlled by reversing solenoid MR. This solenoid is supported on cover plate 776 of the gear unit and includes an armature 777 extending downwardly. This armature carries a double-faced cam element 778 having two surfaces 780 and 781 disposed at an angle to the axis of armature 777. These surfaces are disposed for engagement with two cooperating surfaces 782 and 783 formed on follower member 784, which member is secured in any suitable manner to reversing shaft 770. Armature 777 also carries an extension 785 journaled in bearing block 786 and carrying a collar 787. A compression spring 788 is compressed between the bearing block 786 and collar 787 for urging armature 777 towards its extended, or downward, position.

When the reversing solenoid MR is energized, armature 777 is retracted, or raised, so that cam surface 780 bears against surface 782 and forces reversing shaft 770 to the left bringing gear 767 into engagement with pinion 766. When the solenoid is deenergized, spring 788 forces armature 777 downwardly bringing cam surface 781 into engagement with follower surface 784 to force shaft 777 to the right. This brings forward gear 768 into engagement with pinion 766.

PLATEN DRIVE

Figure 10:
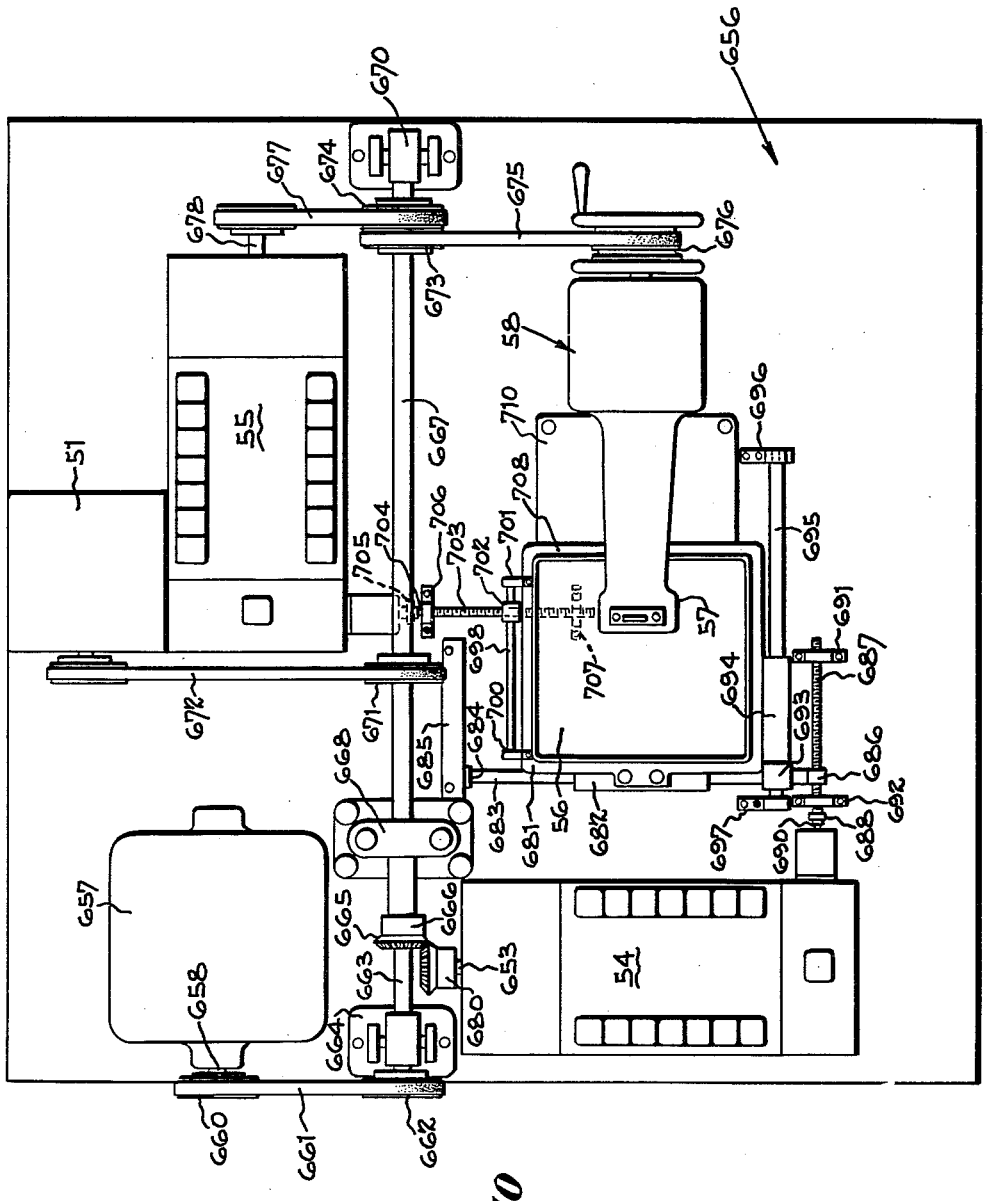
FIGURE 10 is a top plan view of a stitching machine worktable and worktable driving mechanism.

FIGURE 10 shows one preferred form of a platen drive 656. As there shown, a platen, or worktable, 56 is mounted for movement beneath the head of a stitching machine 58. Power for operating the stitching machine and shifting the platen is provided by electric motor 657. Output shaft 658 of this motor carries a pulley 660 in engagement with a cleated timing belt 661. This belt drives a second pulley 662 mounted on a shaft 663 journalled in bearing block 664. Shaft 663 carries a bevelled gear 665 and is joined by coupling member 666 to main shaft 667 which is journalled in bearing blocks 668 and 670.

Main shaft 667 carries pulley 671 for driving a timing belt 672 which is connected to tape reader unit 51 and is effective to synchronize the operation of the tape reader with the sewing machine. Shaft 667 also carries pulleys 673 and 674. Pulley 673 engages timing belt 675 which drives the sewing machine spindle through pulley 676; while pulley 674 engages a timing belt 677 for driving input shaft 678 of "Y" gear unit 55. Power input for "X" gear unit 54 is obtained through bevel gear 680 mounted on input shaft 653 of the "X" gear unit in engagement with bevel gear 665.

Worktable 56 includes a rectangular frame 681 provided with any suitable means (not shown) for supporting the work to be stitched. Frame 681 is bolted, or otherwise secured, to sleeve 682, slidably supported on rod 683. This rod extends parallel to the "Y" axis and is provided at one end with wheel 684 adapted to engage a longitudinal track 685 disposed in alignment with the "X" axis. The other end of rod 683 carries a block 686 having a threaded opening in cooperative engagement with a power screw 687. Power screw 687 is coupled by means of a suitable coupling member 688 to output shaft 690 of "X" gear unit 54, and is rotatably journalled in bearing blocks 691 and 692. The end of rod 683 adjacent to power screw 687 is journalled in a bearing block 693 joined to sleeve 694. This latter sleeve 694 is slidably mounted upon a stationary rod 695 supported in alignment with the "X" axis by means of mounting brackets 696 and 697.

The slide of the worktable remote from stationary rod 695 carries a rod 698, the ends of which are supported by brackets 700 and 701 bolted, or otherwise secured, to frame 681. Rod 698 slidably carries a threaded block 702 having an opening in threaded engagement with power screw 703 connected to the output shaft 704 of "Y" gear 55 by means of coupling member 705. Power screw 703 is rotatably journalled in stationary bearing blocks 706 and 707. Side 708 of frame 681 can be supported by means of a wheel or other member (not shown) in engagement with horizontal platform 710.

In operation, when output shaft 690 of the "X" unit is rotated movable rod 683 is shifted to the right or left. Since this rod supports sleeve 682 which is directly connected to the worktable, the worktable is also shifted along the "X" axis. Power screw 703 is effective when rotated to shift the platen along the "Y" axis. This power screw is connected to the work-holding frame by means of block 702 in engagement with rod 698. During movement of the wortable parallel to the "Y" axis, sleeve 682 slides over rod 683; while during movement along the "X" axis sleeve 694 and block 702 respectively slide along rods 695 and 698.

MECHANICAL DECODING AND DRIVE UNIT

In the embodiment shown in FIGURE 10, worktable 56 is driven by means of two gear units 54 and 55, each of which includes a plurality of solenoids energized by electrical binary decoders 52 and 53 (not shown in FIGURE 10, but note FIGURE 1). It will be recalled that each of the binary decoders is adapted to receive from the tape reader four signals corresponding to the four binary numbers 0001, 0010, 0100, and 1000. The binary decoders electronically transform these four binary input signals into one signal representing an integer in the decimal system. This one output signal from the binary decoder, energizes one of the quill solenoids in the gear unit to provide a gear connection in the unit for driving the worktable.

In contrast, modified gear unit 790 is adapted to receive signals in binary form directly from the punched tape reader. Gear unit 790 is effective to mechanically decode this binary signal to a decimal signal and to rotate an output shaft an amount correlated with this decimal number. The output shaft of the gear unit is connected to a platen feed screw, such as, screw 687 in FIGURE 10; so that the platen is shifted along the axis an amount determined by the rotation of the output shaft. Since the "X" and "Y" gear units are identical, only the "X" unit will be described in detail.

Figure 11:
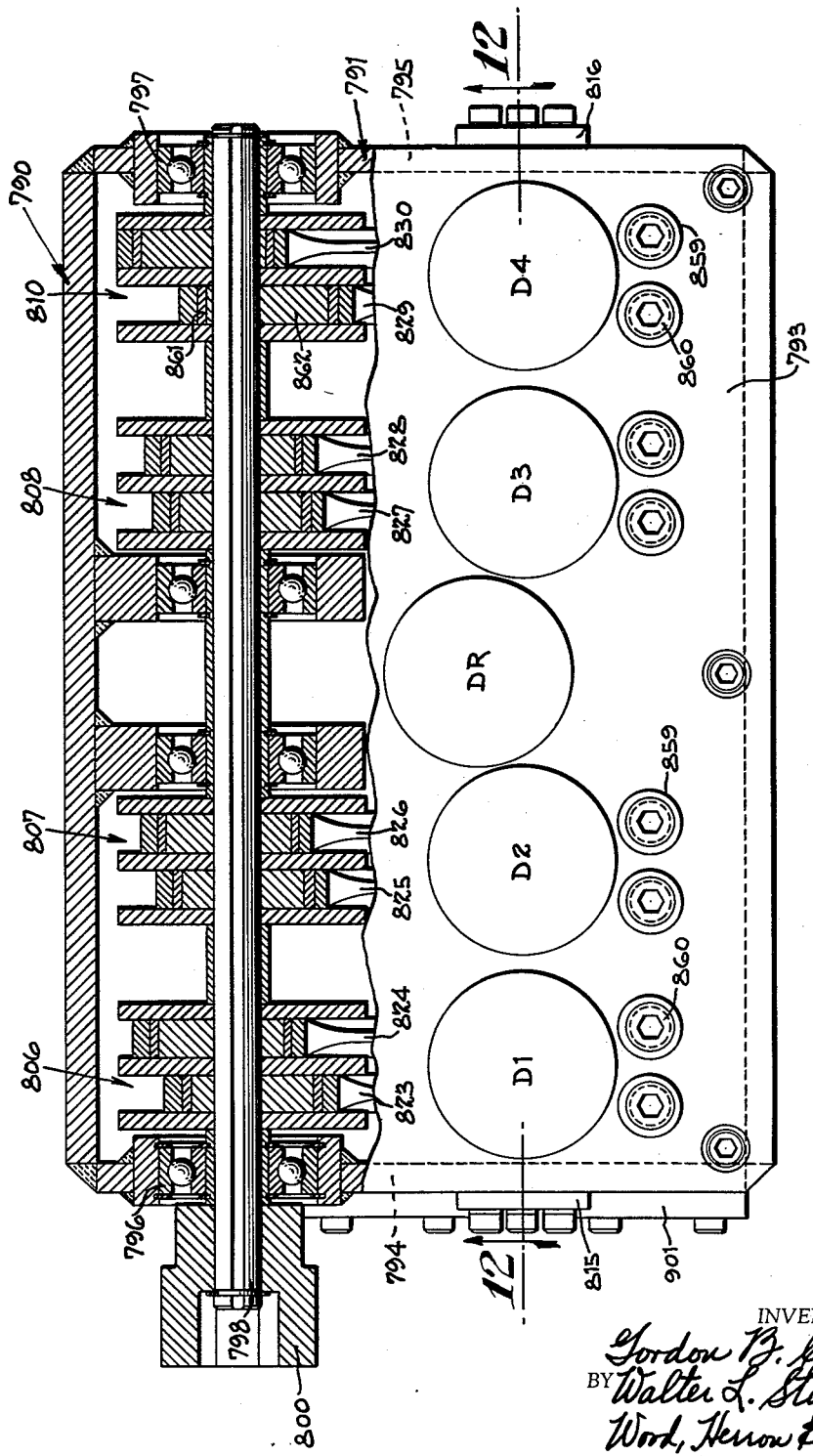
FIGURE 11 is a top plan view of a mechanical decoder and gear unit, a portion of the cover being broken away to show details of construction.
Figure 12:
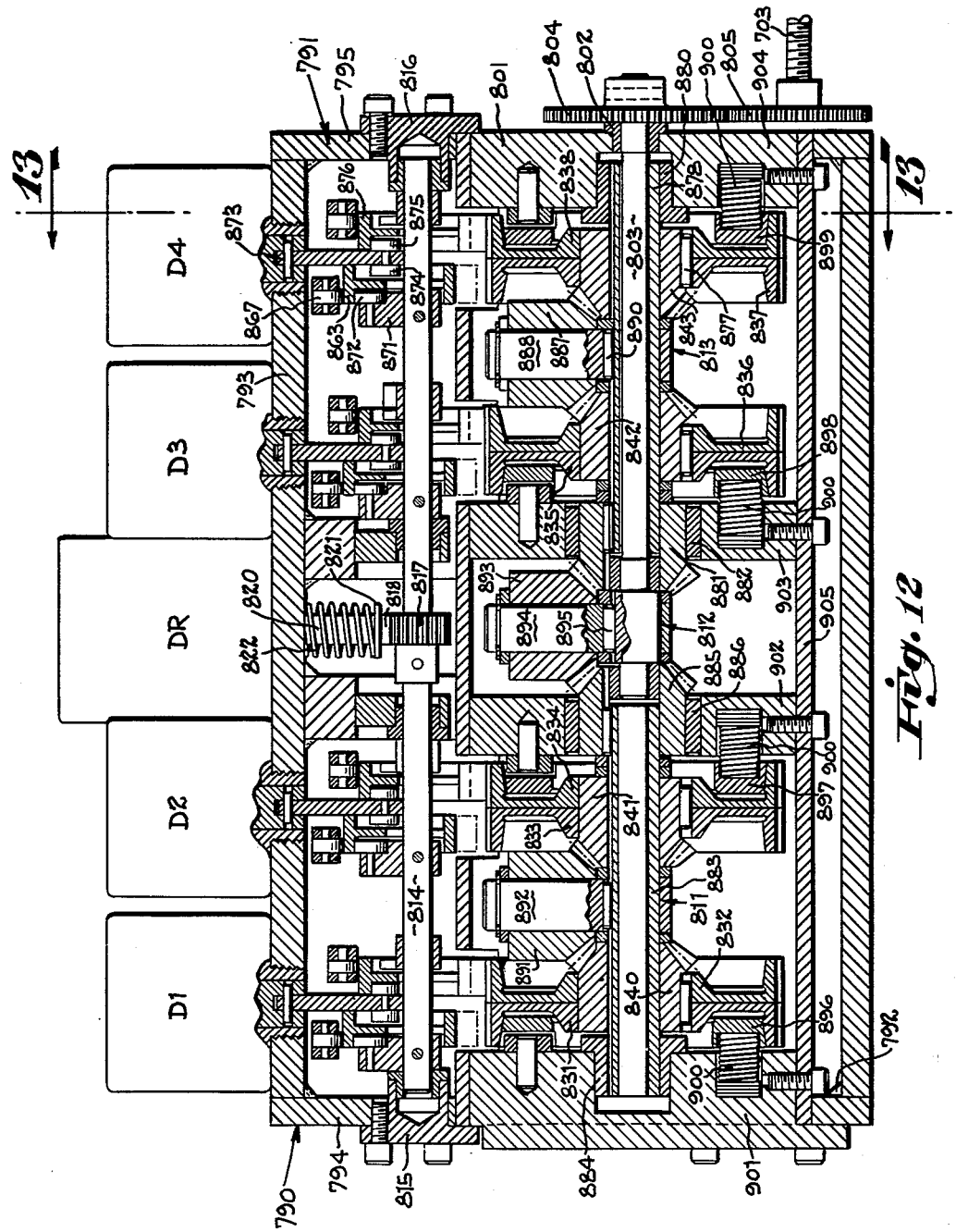
FIGURE 12 is a cross-sectional view taken along line 12—12 of FIGURE 11.
Figure 13:
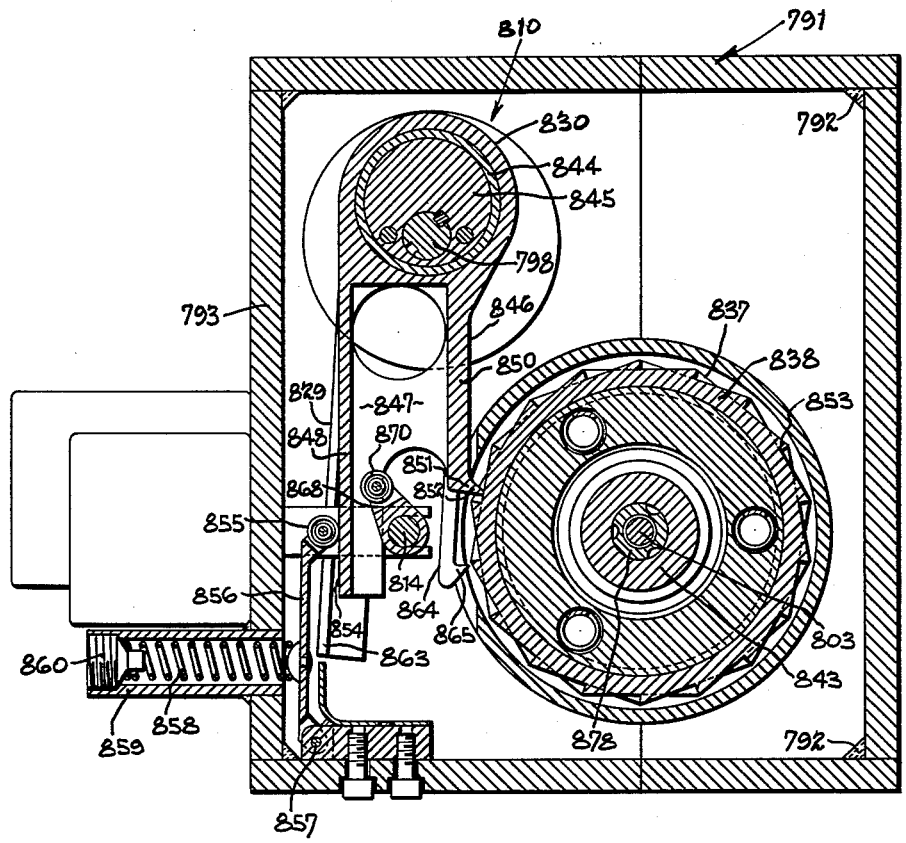
FIGURE 13 is a cross-sectional view taken along line 13—13 of FIGURE 12.

More specifically, as shown in FIGURES 11, 12 and 13, one preferred form of a mechanical gear and decoding unit comprises a housing 791 formed of metal plates welded together as at 792. The upper wall, or cover 793, of housing 791 supports solenoids D1, D2, D3, and D4, and reversing solenoid DR. End walls 794 and 795 of the housing are provided with suitable anti-friction bearings 796 and 797 for rotatably journalling input shaft 798. One end of this shaft carries a pulley 800 for connection with a timing belt, or the like, effective to rotate the shaft in synchronism with the sewing machine spindle. Wall 795 also carries a bearing support member 801 which is fitted with a bushing 802 for supporting one end of an output shaft 803 of the gear box. The outer end of this shaft carries pinion 804 which meshes with gear 805 secured to a feed screw, such as, feed screw 687 in FIGURE 10. Output shaft 803 is selectively connected to input shaft 798 in accordance with the energization of solenoids D1–D4 and DR so that the output shaft is rotated an amount and direction determined by the energization of the solenoids in accordance with the instructions on the punched tape.

Each of the solenoids D1–D4 has associated therewith, a ratchet drive 806, 807, 808, and 810. As explained below, these ratchet drives are constructed so that ratchet unit 806 is adapted to provide one unit of motion, ratchet 807 is adapted to provide two units of motion, ratchet unit 808 is adapted to provide four increments of motion, and ratchet unit 810 is adapted to provide eight increments of motion. The increments of motion of these various ratchet drives are combined in three differential bevel gear units 811, 812, and 813 to produce one of a total of sixteen different increments of motion of the output shaft, and hence, of the worktable.

In addition to the input and output shafts, unit 790 also includes a reverse shaft 814. This shaft is journaled in end bearings 815 and 816 bolted, or otherwise, secured to end walls 794 and 795 of the housing. This reversing shaft carries a pinion 817 which is mounted in any suitable manner for rotation therewith. This pinion is disposed for engagement with a rack 818 carried by armature 820 of the reversing solenoid DR. When the reversing solenoid is energized, this rack is shifted to rotate reversing shaft 814 through a predetermined angle (60° in the preferred embodiment). Armature 820 also carries a collar 821 in engagement with one end of a spring 822 compressed between that collar and cover member 793 of the housing. This compression spring is effective to rotate reversing shaft clockwise in FIGURE 24 when reversing solenoid DR is deenergized.

As best shown in FIGURES 11 and 13, each of the ratchet drives 806–810 includes two pawls 823—830 supported upon input shaft 798, and carried by bevel gears 840, 841, 842, and 843. Since each of the ratchet drives is substantially identical except for the eccentricity of the pawl assemblies, only the unit 810 associated with solenoid D4 will be described in detail. This ratchet unit includes a left-hand, or "reverse," pawl member 829 and a right-hand, or "forward," pawl member 830. Each of these pawl members is mounted upon an annular bearing sleeve 844 carried by an eccentric camming member 845. Eccentric cam 845 is, in turn, keyed, or otherwise, mounted upon reversing shaft 814 for rotation therewith. Pawl 830 includes an elongated arm 846 of generally I-shaped cross-section including a central web 847 and longitudinal flanges 848 and 850. Inner flange 850 includes a finger 851 adapted for driving engagement with right-hand ratchet wheel 838. This finger includes an abutment face 852 adapted to engage one of the teeth 853 on ratchet wheel 838 for forcing that wheel in a counterclockwise direction in FIGURE 13. Outer face of 854 flange 848 is in engagement with ball bearing roller 855 rotatably mounted on lever arm 856. The opposite end of this lever arm is pivotally mounted as at 857, and the lever arm is urged into engagement with the pawl (clockwise in FIGURE 13) by means of a spring 858 mounted within cylinder 859 and compressed between the lever arm and a set screw 860 in threaded engagement with the outer end of cylinder 859.

Reversing pawl 829 is mounted on bearing sleeve 861 disposed over an eccentric driving cam 862. Pawl 829 is of generally I-shaped cross-section and includes an outer flange 863 and an inner flange 864, the end of which is configurated to form a finger 865 for advancing lefthand ratchet wheel 837 in a clockwise direction when pawl 829 is shifted by rotation of input shaft 798. A second spring urged, pivoted lever arm assembly, including a roller 867 in engagement with flange 863, is provided for spring urging pawl 829 toward ratchet wheel 837.

The position of reversing shaft 814 controls which of the two pawls 829, 830 is conditioned for engagement with ratchet wheel 838 in response to a signal applied to solenoid D4. In this regard, it is to be noted that in the present decoding and gear device, the relays D1, D2, D3, D4, and DR are deenergized by signals from the tape reader; whereas, in the previously described gear unit, the solenoids were energized by signals from the decoder. Deenergization of solenoids D1–D4, and DR is readily accomplished, as for example, by applying the signal from the tape reader to a normally closed relay in circuit connection with the solenoid coil.

As explained above, reversing shaft 814 is rotated in a clockwise direction in FIGURE 13 when reversing solenoid DR is deenergized and is rotated in a counterclockwise direction when solenoid DR is energized. The reversing shaft carries a radial arm 868 provided with a rotatable roller mounted on the free end of the arm and adapted for engagement with flange 848 of pawl member 830 when the reversing shaft is rotated to its "reverse" direction in response to the energization of reversing solenoid DR. Roller 870 thus forces pawl 830 in a clockwise direction about bearing sleeve 844, thereby disengaging finger 851 from ratchet wheel 838. When the reverse solenoid is deenergized, reverse shaft 814 is rotated in a clockwise direction, shifting arm 868 away from flange 848 so that pawl 830 is free to be shifted inwardly under the influence of spring 858 to a position in engagement with ratchet wheel 838.

Reverse shaft 814 also carries a second radial arm 871 which supports roller 872 mounted thereon and adapted for engagement with flange 863 of pawl member 829. This arm is angulated with respect to arm 868 so that when shaft 814 is in the "forward" position shown in FIGURE 13, roller 872 engages flange 863 and locks pawl 829 out of engagement with ratchet wheel 837. Thus, if reversing solenoid DR is deenergized, the right-hand pawls 830, 828, 826, and 824 are positioned in engagement with their associated ratchet wheels 829, 827, 825, and 823 if their corresponding solenoids D4, D3, D2, and D1 are deenergized.

The reversing solenoid thereby functions to condition the forward or reverse pawls for engagement with their associated ratchet wheels. However final control over the pawls is exerted by solenoids D1–D4. As best shown in FIGURE 12, armature 873 of solenoid D4 carries two ball-bearing members 874 and 875 adapted for engagement with flanges 863 and 876 of pawl members 829 and 830. When the solenoid is deenergized, the armature extends downwardly as shown in FIGURES 12 and 13. In this position ball-bearing members 874 and 875 are spaced below flanges 863 and 876 a sufficient distance to permit the pawl member not restrained by its associated reversing shaft arm to be forced downwardly by its associated spring lever into engagement with the adjacent ratchet wheel. When solenoid D4 is energized, the armature is raised so that ball-bearings 874 and 875 engage flanges 863 and 876, lifting both pawl members to prevent either pawl member from engaging its ratchet wheel.

Ratchet wheels 837 and 838 are mounted upon the hub of bevel gear 843. These ratchet wheels are keyed together and to the hub in any suitable manner, such as by means of pins 877. Bevel gear 843 is rotatably mounted upon a hollow intermediate shaft 878 which surrounds output shaft 803. In the same manner, ratchet wheels 835 and 836 are keyed to bevel gear 842 which bevel gear is also supported upon secondary shaft 878. One end of shaft 878 is journaled in flanged bearing member 880, while the other end is supported in bevel gear 881 which is in turn rotatably journalled in bushing 882.

In a similar fashion, ratchet wheels 831 and 832 are keyed to bevel gear 840, and ratchet wheels 833 and 834 are keyed to bevel gear 841. Bevel gear 841 is rotatably mounted upon a second intermediate shaft 883 journaled in bearing member 884 and supported by bevel gear 885. Bevel gear 885 is journaled in bearing sleeve 886.

Bevel gears 842 and 843 constitute two gears of differential gear unit 813. The third gear of this unit is bevel gear 887. This gear is rotatably mounted upon a shaft 888 which is mounted in any suitable manner upon secondary shaft 878 and is keyed thereto as by pins 890. If bevel gear 843 is revolved a certain number of increments, for example, 8 increments, it drives planetary gear 887; which, in turn, causes secondary shaft 878 to rotate eight units. If at the same time, bevel gear 842 is driven four units, planetary gear 887, will be rotated this additional amount, so that the rotation of bevel gears 842 and 843 will be combined to rotate intermediate shaft 878, 12 units. In a similar manner, any movements of bevel gears 840 and 841 are combined by movements of a bevel gear 891; rotatably secured to a shaft 892 which is keyed to secondary shaft 883.

Rotation of secondary shafts 878 and 883 causes corresponding rotations of bevel gears 885 and 881. Bevel gears 885 and 881 form two gears of central differential gear unit 12. This unit includes a third bevel gear 893 mounted upon a shaft 894 which is keyed or pinned to output shaft 803 as by means of pin 895. Bevel gear 893 combines the movements of bevel gears 881 and 885 and transforms these movements into rotation of output shaft 803, which shaft drives platen feed screw 703 through gears 804 and 805.

In addition to the components described above, means are provided for preventing gear backlash and spurious motions within the unit. One preferred form of these means comprises frusto-conical friction shoes 896, 897, 898, and 899. These shoes frictionally engaged the rims of ratchet wheels 831, 834, 835, and 838. Each of the brake shoes is urged into engagement with its associated ratchet wheel by means of compression springs 900, these compression springs being seated within openings formed in transverse support bearing members 901, 902, 903, and 904. Bearing support members 901 and 904 are mounted in any suitable manner in end walls 794 and 795 of housing 791. These members carry a generally cylindrical shell or sleeve 905 which partially encloses the ratchet wheels and planetary gear units. Transverse support members 902 and 903 are bolted or otherwise secured to intermediate portions of the sleeve.

It is to be understood that the embodiments of the present invention described in detail above are merely illustrative; and it is contemplated that those skilled in the art will readily comprehend various modifications to which the present invention is susceptible. Thus, while the invention has been described in connection with a stitching machine, the invention can also be utilized in many different types of equipment including means for shifting work relative to a tool in such a manner that control is maintained both of the contour along which the work is moved relative to the tool; and also of the rate at which work passes the tool. In other words, the present invention has utility whenever it is desired to control the length of pattern moved past the tool between each successive actuation of the tool. Among the types of apparatus specifically contemplated are: spot-welding devices, plastic fastening machines, stapling machines, punching devices, and the like.

It is also understood that one or more components of the present apparatus can be varied without departing from the basic principles of the present invention. Thus, for example, instead of the semi-automatic tracer described above, a fully automatic tracer, such as, a line follower or manual tracer, could be used to actuate the signal generators. Moreover, while the specific signal generators disclosed are highly advantageous, other forms of signal generators, such as, a capacitive type pick-up or a contact type pick-up could be employed to generate the signals applied to the binary counters.

It is also contemplated that the specific form of the binary counters may be varied, if a different kind of signal generator is employed. Thus, while the preferred form of binary counter is responsive to the pulse sequence as an indication of the direction follower movement, binary counters could be constructed which utilize an independent signal to indicate reversal of follower motion. This and other changes could be incorporated in the binary counter without changing their basic function of counting and storing the number of incremental movements made by the follower.

While the preferred form of information carrier or storage medium is a punched tape, it is to be understood that other media could be employed if desired. One alternative form of information carrier is a magnetic tape. A magnetic tape system has certain disadvantages in that it requires more complex electronic circuits for reading the tape, is more affected by vibration, and requires a minimum operating speed. However, such a system can be operated at a substantially higher maximum speed than a punched tape system and for that reason may be desirable in certain installations.

Moreover, while the stitch spacing control circuit and decoders are shown as employing magnetic relays, it is contemplated that other types of electrical switching devices, such as, electronic tubes or transistors could be employed.

It is also to be understood that while the platen shifting apparatus shown in the drawings utilizes timing belts for synchronizing the operation of the various component mechanisms, other forms of power transmission, such as, chains, gears, or the like can readily be substituted.

In view of these and the many other changes which can be made without departing from the invention, we intend to be limited only by the scope of the following claims.

Having described our invention we claim:

1. In combination with a movable work carrying platen, a component drive for shifting said work carrying platen relative to a tool, said drive comprising a continuously rotating input shaft, a rotatable output shaft, electrical means responsive to coded input signals, means operatively connecting said output shaft in driving connection with said platen, mechanical means associated with said electrical means for converting said coded input signals to incremental rotation of said output shaft, said incremental rotation comprising multiples of a unit of rotation, the number of multiples being equal to the decimal equivalent of the coded input signal.

2. In combination with a movable work carrying platen, a platen drive for shifting said platen relative to a tool, said platen drive comprising a continuously rotating input shaft, an output shaft, a plurality of pawls and a plurality of ratchet wheels, said ratchet wheels being mechanically interconnected to the input shaft, a plurality of solenoids responsive to binary coded electrical input signals for conditioning said pawls for engagement with said ratchets, means for combining the movements of said ratchet wheels to drive the output shaft, whereby continuous rotation of the input shaft is converted to incremental rotary movement of said output shaft in accordance with the input signals, means operatively connecting said output shaft in driving connection with said platen.

3. In combination with a movable work carrying platen, a platen drive for shifting said platen relative to a tool, said platen drive comprising a continuously rotating input shaft, an output shaft, a plurality of pawls and a plurality of ratchet wheels, said ratchet wheels being mechanically interconnected to the input shaft, a plurality of solenoids responsive to binary coded electrical input signals for conditioning said pawls for engagement with said ratchets, means for combining the movements of the individual ratchet wheels to drive said output shaft, whereby continuous rotation of the input shaft is converted to incremental rotary movement of said output shaft in accordance with the input signals, a reversing solenoid, and means controlled by said solenoid for effecting reversal of the direction of rotation of said output shaft, means operatively connecting said output shaft in driving connection with said platen.

4. In combination with a work carrying member, a component drive mechanism for shifting said work carrying member relative to a tool, said driving mechanism comprising a plurality of ratchet and pawl sets, a continuously rotating input shaft adapted to advance said pawls for rotating said ratchet wheels, electric solenoids for controlling engagement of the ratchet and pawls, planetary gear means driven by said ratchet wheels, and an output shaft connected to said gear means, whereby said gear means are effective to combine the movements of said ratchet wheels to produce an output rotation of said shaft corresponding to the sum of movements of said ratchet wheels, means operatively connecting said output shaft in driving connection with said platen.

5. A component drive mechanism for shifting a work platen comprising an input shaft adapted to be rotated continuously, an output shaft, a plurality of pawl and ratchet wheel assemblies, each of said pawl and ratchet assemblies comprising a forward pawl, a reverse pawl, and ratchet wheels associated with each of said pawls, eccentric cam members mounted for rotation with said input shaft, each of said pawls being rotatably mounted upon an eccentric member, the forward pawls of each set being effective to rotate its associated ratchet wheel in one direction, the reverse pawl being adapted to rotate its associated ratchet wheel in the opposite direction, the ratchet wheel of each pawl and ratchet assembly being mounted for rotation with a bevel gear, the bevel gears of adjacent pawl and ratchet assemblies being in driving engagement with a planetary gear, each of said planetary gears being mounted upon a transverse shaft, intermediate shafts for supporting each of said transverse shafts, bevel gears mounted on the ends of said intermediate shafts, said bevel gears being disposed adjacent to one another and in driving relationship with a main planetary gear, said main planetary gear being mounted upon a main transverse shaft, said main transverse shaft being secured to the output shaft, and being effective to cause rotation of said output shaft, a plurality of control solenoids, one of said solenoids being associated with each of said pawl and ratchet assemblies, shiftable abutment means controlled by said solenoids and adapted to engage said pawls to prevent engagement of said pawls with said ratchet wheels.

6. A component drive mechanism for shifting a work platen comprising an input shaft adapted to be rotated continuously, an output shaft, a plurality of pawl and ratchet wheel assemblies, each of said pawl and ratchet assemblies comprising a forward pawl, a reverse pawl, and ratchet wheels associated with each of said pawls, eccentric cam members mounted for rotation with said input shaft, each of said pawls being rotatably mounted upon an eccentric member, the forward pawls of each set being effective to rotate its associated ratchet wheel in one direction, the reverse pawl being adapted to rotate its associated ratchet wheel in the opposite direction, the ratchet wheel of each pawl and ratchet assembly being mounted for rotation with a bevel gear, the bevel gears of adjacent pawl and ratchet assemblies being in driving engagement with a planetary gear, each of said planetary gears being mounted upon a transverse shaft, intermediate shafts for supporting each of said transverse shafts, bevel gears mounted on the ends of said intermediate shafts, said bevel gears being disposed adjacent to one another and in driving relationship with a main planetary gear, said main planetary gear being mounted upon a main transverse shaft, said main transverse shaft being secured to the output shaft, and being effective to cause rotation of said output shaft, a plurality of solenoids, one of said solenoids being associated with each of said pawl and ratchet assemblies, shiftable abutment means controlled by said solenoid and adapted to engage said pawls to prevent engagement of said pawls with said ratchet wheels, a reversing solenoid and shiftable abutment means actuated by said solenoid for preventing engagement of the forward or reverse pawl of each of said pawl and ratchet sets with said ratchet wheels.

7. A component drive mechanism for shifting a work platen comprising an input shaft adapted to be rotated continuously, an output shaft, a plurality of pawl and ratchet wheel assemblies, each of said pawl and ratchet assemblies comprising a forward pawl, a reverse pawl, and ratchet wheels associated with each of said pawls, eccentric cam members mounted for rotation with said input shaft, each of said pawls being rotatably mounted upon an eccentric member, the forward pawls of each set being effective to rotate its associated ratchet wheel in one direction, the reverse pawl being adapted to rotate its associated ratchet wheel in the opposite direction, the ratchet wheel of each pawl and ratchet assembly being mounted for rotation with a bevel gear, the bevel gears of adjacent pawl and ratchet assemblies being in driving engagement with a planetary gear, each of said planetary gears being mounted upon a transverse shaft, intermediate shafts for supporting each of said transverse shafts, bevel gears mounted on the ends of said intermediate shafts, said bevel gears being disposed adjacent to one another and in driving relationship with a main planetary gear, said main planetary gear being mounted upon a main transverse shaft, said main transverse shaft being secured to the output shaft, and being effective to cause rotation of said output shaft, a plurality of solenoids, one of said solenoids being associated with each of said pawl and ratchet assemblies, shiftable abutment means controlled by said solenoid and adapted to engage said pawls to prevent engagement of said pawls with said ratchet wheels, a reversing solenoid and shiftable abutment means actuated by said solenoid for preventing engagement of the forward or reverse pawl of each of said pawl and ratchet sets with said ratchet wheels, said last named means including a rack shiftable by said reversing solenoid, a reversing shaft, a gear carried by said shaft, said rack and gear being adapted to rotate said shaft through a predetermined angle, a plurality of pairs of arms carried by said shaft, one of the arms of each set being adapted to engage a forward pawl and hold it away from its associated ratchet when the shaft is in one position, the other of said arms being adapted when the reversing shaft is rotated to engage the reversing pawl and hold it away from its associated ratchet.

8. A component drive mechanism for shifting a work carrying member relative to a tool, said driving mechanism comprising a plurality of ratchet and pawl sets each of said ratchet and pawl sets comprising a forward pawl, a reverse pawl and ratchet wheels associated with each of said pawls, the forward pawl being effective to rotate its associated ratchet wheel in one direction, the reverse pawl being adapted to rotate its associated ratchet wheel in the opposite direction, a rotary input shaft adapted to advance said pawls for rotating said ratchet wheels, a reversing solenoid, means controlled by the reversing solenoid for conditioning either the forward pawls or the reverse pawls for engagement with their respective ratchet wheels, a plurality of control solenoids, one of said control solenoids being associated with each pawl and ratchet sets, and means actuated by each of said solenoids for preventing engagement of the pawls conditioned for engagement by said reversing solenoid with said ratchet wheels, means for combining the movements of the individual ratchet wheels to drive said output shaft.

9. In combination with a movable work carrying platen, a component drive mechanism for shifting said work carrying member relative to a tool, said driving mechanism comprising a plurality of ratchet and pawl sets, each of said ratchet and pawl sets comprising a forward pawl, a reverse pawl and ratchet wheels associated with each of said pawls, the forward pawl being effective to rotate its associated ratchet wheel in one direction, the reverse pawl being adapted to rotate its associated ratchet wheel in the opposite direction, a rotary input shaft adapted to advance said pawls for rotating said ratchet wheels, a reversing solenoid, means controlled by the reversing solenoid for conditioning either the forward pawls or the reverse pawls for engagement with their respective ratchet wheels, a plurality of control solenoids, one of said control solenoids being associated with each pawl and ratchet sets, and means actuated by each of said solenoids for preventing engagement of the pawls conditioned for engagement by said reversing solenoid with said ratchet wheels, spring loaded friction brake shoes in engagement with said ratchet wheels for preventing spurious movements thereof, an output shaft mechanically interconnected to said platen, and means for combining the movements of the individual ratchet wheels to drive said output shaft.

10. In combination with a movable work carrying member, a component drive mechanism for shifting said work carrying member relative to a tool, said driving mechanism comprising four ratchet and pawl sets, a continuously rotating input shaft adapted to advance said pawls for rotating said ratchet wheels, one of said pawls being effective to rotate its associated ratchet wheel one increment of rotation, a second pawl being effective to rotate its ratchet wheel two increments, a third pawl being effective to rotate its ratchet wheel four increments, and the fourth pawl being effective to rotate its ratchet wheel eight increments, electric solenoids for controlling engagement of the ratchet and pawls, planetary gear means driven by said ratchet wheels, and an output shaft connected to said gear means whereby said gear means are effective to combine the movements of said ratchet wheels to produce an output rotation of said shaft corresponding to the sum of movements of said ratchet wheels, means operatively connecting said output shaft in driving connection with said platen.

11. A platen drive for shifting a platen relative to a tool, said drive comprising a continuously rotating input shaft, an output shaft, means for converting the rotary movement of said input shaft to intermittent movement of a second shaft, a third shaft, a gear unit including a plurality of control solenoids, means interconnecting said solenoids and a plurality of gears for providing selective interconnection between said second shaft and said third shaft, said gears having different leads whereby the amount of rotation of said third shaft is determined by the gear actuated by said solenoids, and means interconnecting said third shaft and said output shaft.

12. A platen drive for shifting a platen relative to a tool, said drive comprising a continuously rotating input shaft, an output shaft, means for converting the rotary movement of said input shaft to intermittent movement of a second shaft, a third shaft, a gear unit including a plurality of control solenoids, means interconnecting said solenoids and a plurality of gears for providing selective interconnection between said second shaft and said third shaft, said gears having different leads whereby the amount of rotation of said third shaft is determined by the gear actuated by said solenoids, and reversing means interconnecting said third shaft and said output shaft, said reversing means including a reversing solenoid, two spaced opposed bevel gears mechanically interconnected to said output shaft, a third bevel gear mechanically interconnecting to said third shaft, and means actuated by said reversing solenoid for shifting said bevel gears axially relative to said third bevel gear.

13. In a gear unit for driving a platen relative to a tool, said gear unit comprising a continuously rotating input shaft, the combination of means for converting the continuous rotation of said input shaft to intermittent rotation of a second shaft, a plurality of quill units, each of said units comprising a housing rotatably mounted upon said second shaft, a worm rotatably mounted upon said quill housing, a gear mounted upon said second shaft in engagement with said worm, a third shaft, a second gear mounted upon said third shaft and adapted for engagement with the worm carried by said quill housing, spring means normally urging said quill housing away from said second gear, a solenoid associated with each quill unit, a cam actuated by each of said solenoids, each of said cams being effective for shifting one of said quill housings to bring said worm into engagement with said second gear.

14. A gear unit for driving a platen relative to a tool, said gear unit comprising a continuously rotating input shaft, means for converting the continuous rotation of said input shaft to intermittent rotation of said second shaft, a plurality of quill units, each of said quill units comprising a housing rotatably mounted upon said second shaft, a worm rotatably mounted on said quill housing, a gear mounted upon said second shaft in engagement with said worm, a third shaft, a gear mounted upon said third shaft and adapted for engagement with the worm carried by said quill housing, the worm and gears of each quill unit having different lead angles, spring means normally urging said quill housing away from said second gear, a solenoid associated with each of said quill units and cam means actuated by said solenoid for shifting said quill housing to bring said worm into engagement with said second gear, an output shaft and reversing means mechanically interconnecting said output shaft and said third shaft.

15. In combination with a movable work carrying platen, a platen drive for shifting said work carrying platen relative to a tool, said platen drive comprising a continuously rotating input shaft, an output shaft, a plurality of pawls and a plurality of ratchet wheels, said ratchet wheels being mechanically interconnected to the input shaft, a plurality of solenoids responsive to binary coded electrical input signals for conditioning said ratchets for engagement with said pawls, whereby continuous rotation of the input shaft is converted to incremental rotary movement of said output shaft in accordance with the input signals, and means interconnecting said output shaft to said platen, whereby said platen is positioned relative to said tool in accordance with the movement of said output shaft.

16. In combination with a movable work carrying platen, a platen drive for shifting said work carrying platen relative to a tool, said platen drive comprising a continuously rotating input shaft, an output shaft, means for mechanically decoding electrical input signals in binary form and converting said signals to rotation of said output shaft, said means comprising solenoid operated means interconnecting said input shaft and output shaft, said solenoid means being energized by said electrical input signals in binary form and being effective to rotate said output shaft, means interconnecting said output shaft in driving relationship with said platen, said output shaft being rotated an amount corresponding to the decimal equivalent of the binary input signal.

References Cited in the file of this patent

UNITED STATES PATENTS

| | | |
|---|---|---|
| 417,840 | Ross | Dec. 24, 1889 |
| 1,446,267 | Newcomb | Feb. 20, 1923 |
| 1,695,694 | MacFarland | Dec. 18, 1928 |
| 1,902,245 | Kinser | Mar. 31, 1933 |
| 2,027,618 | Ronning | Jan. 14, 1936 |
| 2,150,014 | Walter | Mar. 7, 1939 |
| 2,371,734 | Buttress | Mar. 20, 1945 |
| 2,408,488 | Sorensen | Oct. 1, 1946 |
| 2,416,739 | Chandler | Mar. 4, 1947 |
| 2,489,305 | McLennan | Nov. 29, 1949 |
| 2,508,953 | Knutsen | May 23, 1950 |
| 2,521,946 | Rathje | Sept. 12, 1950 |
| 2,535,125 | Ferry | Dec. 26, 1950 |
| 2,558,953 | Heminger et al. | July 3, 1951 |
| 2,602,588 | Keen | July 8, 1952 |
| 2,650,332 | Bordewieck | Aug. 25, 1953 |
| 2,668,934 | Nierman | Feb. 9, 1954 |
| 2,675,176 | Perrin | Apr. 13, 1954 |
| 2,698,410 | Madsen et al. | Dec. 28, 1954 |
| 2,706,914 | Spence | Apr. 26, 1955 |
| 2,754,059 | Wilcox | July 10, 1956 |
| 2,764,039 | Black | Sept. 25, 1956 |
| 2,775,299 | Dowry | Dec. 25, 1956 |
| 2,781,848 | Thomas | Feb. 19, 1957 |
| 2,789,766 | Wood | Apr. 23, 1957 |

FOREIGN PATENTS

| | | |
|---|---|---|
| 147,261 | Great Brtain | July 8, 1920 |
| 382,471 | Germany | Feb. 10, 1923 |
| 789,158 | France | Apr. 6, 1935 |